US012620603B2

(12) United States Patent
Höflich

(10) Patent No.: US 12,620,603 B2
(45) Date of Patent: May 5, 2026

(54) BIPOLAR PLATE, FUEL CELL, AND METHOD FOR PRODUCING A BIPOLAR PLATE

(71) Applicant: EKPO Fuel Cell Technologies GmbH, Dettingen (DE)

(72) Inventor: Alexander Höflich, Reutlingen (DE)

(73) Assignee: EKPO Fuel Cell Technologies GmbH, Dettingen (DE)

( * ) Notice: Subject to any disclaimer, the term of this patent is extended or adjusted under 35 U.S.C. 154(b) by 614 days.

(21) Appl. No.: 18/103,927

(22) Filed: Jan. 31, 2023

(65) Prior Publication Data

US 2023/0170496 A1     Jun. 1, 2023

Related U.S. Application Data

(63) Continuation of application No. PCT/EP2021/072003, filed on Aug. 6, 2021.

(30) Foreign Application Priority Data

Aug. 12, 2020     (DE) ..................... 10 2020 210 209.0

(51) Int. Cl.
| | |
|---|---|
| *H01M 8/0228* | (2016.01) |
| *H01M 8/0213* | (2016.01) |
| *H01M 8/0215* | (2016.01) |
| *H01M 8/0221* | (2016.01) |

(52) U.S. Cl.
CPC ....... *H01M 8/0228* (2013.01); *H01M 8/0213* (2013.01); *H01M 8/0215* (2013.01); *H01M 8/0221* (2013.01)

(58) Field of Classification Search
CPC ................................................... H01M 8/0228
See application file for complete search history.

(56) References Cited

U.S. PATENT DOCUMENTS

| | | | |
|---|---|---|---|
| 2003/0190516 A1* | 10/2003 | Tanno ................. | H01M 8/0221 429/513 |
| 2006/0090330 A1 | 5/2006 | Kauranen et al. | |
| 2008/0113253 A1 | 5/2008 | Yagi et al. | |
| 2010/0279209 A1 | 11/2010 | Jeong et al. | |
| 2014/0011115 A1 | 1/2014 | Vincent et al. | |
| 2014/0234748 A1* | 8/2014 | Vincent ............... | H01M 8/0221 429/468 |
| 2019/0244722 A1* | 8/2019 | Boscher .............. | H01M 8/0245 |

FOREIGN PATENT DOCUMENTS

| | | |
|---|---|---|
| EP | 3 381 987 A1 | 10/2018 |
| WO | WO 2019201871 A1 | 10/2019 |
| WO | WO 2021073916 A1 | 4/2021 |

OTHER PUBLICATIONS

KR_20140008676transaltion (Year: 2014).*

\* cited by examiner

*Primary Examiner* — Brian R Ohara
(74) *Attorney, Agent, or Firm* — ASLAN LAW, P.C.

(57) ABSTRACT

In order to provide a bipolar plate that has optimized electrical conductivity and can be produced as easily as possible, the invention proposes that the bipolar plate comprises an electrically conductive main body and an electrically conductive coating, wherein the electrically conductive coating comprises a binding material and one or more electrically conductive fillers, and wherein a pigment volume concentration in the coating corresponds at least to a pigment volume concentration required to achieve a percolation threshold.

19 Claims, 2 Drawing Sheets

BIPOLAR PLATE, FUEL CELL, AND METHOD FOR PRODUCING A BIPOLAR PLATE

RELATED APPLICATION

This application is a continuation of international application No. PCT/EP2021/072003 filed on Aug. 6, 2021 and claims the benefit of German application No. 10 2020 210 209.0 filed on Aug. 12, 2020, which are incorporated herein by reference in their entirety and for all purposes.

FIELD OF DISCLOSURE

The present invention relates to a bipolar plate, in particular for a fuel cell.

The invention further relates to a fuel cell, in particular a low-temperature fuel cell.

The present invention further relates to a method for producing a bipolar plate.

Bipolar plates are in particular components of fuel cell stacks in fuel cells and preferably serve to separate the media (reaction gases and coolant) and distribute the reaction gases by means of flow fields via the electrochemically active surface of each fuel cell unit of the fuel cell stack, as well as for electrical conduction via the electrical fuel cell units connected in series in the fuel cell stack and for contacting the gas diffusion layers in each individual fuel cell unit. In addition, reaction heat is dissipated or transferred into the coolant via the bipolar plate units.

To supply the media in an optimized manner, the bipolar plates preferably have an embossed structure comprising flow channels (flow field) through which, in particular, the best possible distribution of the media over the entire surface of the bipolar plate is possible.

A bipolar plate unit is preferably produced by joining an anode bipolar plate and a cathode bipolar plate and can comprise further layers, in particular a layer having an electrically insulating layer for connection to an adjacent bipolar plate unit in the fuel cell stack.

For example, in polymer electrolyte fuel cells, a bipolar plate unit comprising two bipolar plates is arranged alternately with a membrane electrode assembly (MEA). The membrane electrode assembly preferably comprises a polymer electrolyte and two electrodes formed as a gas diffusion layer.

In order to ensure sufficient corrosion resistance under the respective electrochemical conditions, a coating of one of the surfaces of a main body of the bipolar plate facing the MEA in the assembled state is generally necessary.

BACKGROUND

The scientific article "Coating of stainless steel and titanium bipolar plates for anticorrosion in PEMFC: A review" by N. F. Asri et al. in the International Journal of Hydrogen Energy No. 42 (2017), pages 9135 to 9148, summarizes conventional coating methods.

Application of a very thin noble metal layer is known from EP 2 469 634 B1. WO 2009/089376 A2 and EP 2 157 645 B1 disclose application of a thin layer of noble metal clusters or noble metal alloys. However, these methods have the disadvantage that they are associated with high costs and often form discontinuous layers.

WO 2009/065545 A1, WO 2009/108102 A1, CA 2688483 A1, U.S. Pat. No. 5,624,769 A and DE 10 2014 016 186 A1 disclose the application of thin ceramic coatings or plastic coatings on a main body of a bipolar plate. The coatings are usually deposited on bipolar plates by physical vapor deposition (PVD) and/or chemical vapor deposition (CVD). Coatings produced in this way, however, have the disadvantage that they are brittle and bipolar plate main bodies must therefore be coated after a forming process (post-coating). Thus, each bipolar plate main body has to be coated individually, which results in increased production costs. In particular, coatings applied by wet-chemical methods often do not have sufficient adhesion to the main body of the bipolar plate and degrade comparatively quickly.

Multilayer structures are disclosed in U.S. Pat. No. 6,291, 094 B1 and U.S. Pat. No. 8,852,827 B2. However, complex pretreatment of the main body of the bipolar plate is regularly necessary here.

SUMMARY OF THE INVENTION

The object of the present invention is to provide a bipolar plate that has optimized electrical conductivity and can be produced as simply as possible.

According to the invention, this object is solved by a bipolar plate according to claim 1.

The bipolar plate, in particular for a fuel cell, comprises an electrically conductive main body and an electrically conductive coating.

The coating comprises a binding material and one or more electrically conductive fillers.

Preferably, a pigment volume concentration in the coating corresponds at least to a pigment volume concentration required to reach a percolation threshold.

In particular, the pigment volume concentration in the coating is greater than the pigment volume concentration required to reach the percolation threshold.

When the percolation threshold is reached or exceeded, a sudden increase in an electrical conductivity of the coating preferably occurs and steadily increases with a further increase in concentration.

The one or more electrically conductive fillers preferably each comprise filler particles or are formed therefrom.

The filler particles can be, for example, at least approximately platelet-shaped or at least approximately rod-shaped or at least approximately spherical.

In the context of the present description and the appended claims, the "pigment volume concentration" is understood in particular to mean a proportion of the one or more fillers in a total volume of the coating (in particular in a dried state of the coating).

The percolation threshold preferably refers to a limit value and/or a limit concentration of a filler concentration, starting from which approximately 10% or more, in particular approximately 20% or more, of the filler particles are in direct material contact with at least one further filler particle.

In particular, the percolation threshold denotes a limit value and/or a limit concentration of the filler concentration in the coating, starting from which conductivity paths through the coating are formed.

The binding material is preferably electrically insulating.

In the context of the present description and the appended claims, "electrically insulating" preferably means that materials and/or elements to which this refers have an electrical conductivity of less than $10^4$ S/m at 25° C.

In the context of the present description and the appended claims, "electrically conductive" preferably means that materials and/or elements to which this refers have an electrical conductivity of $10^6$ S/m or more at 25° C.

It may be favorable if the pigment volume concentration in the coating corresponds to 1.5 times or less, in particular a 1.2 times or less, a critical pigment volume concentration.

For example, the pigment volume concentration in the coating is selected such that it corresponds at least approximately or exactly to the critical pigment volume concentration.

"At least approximately" preferably refers to a deviation of up to ±20%, in particular ±10%, of a reference value.

The critical pigment volume concentration is preferably a proportion of the one or more fillers in the total volume of the coating at which the filler particles almost touch and intermediate spaces in the coating are filled by the binding material. In particular, the critical pigment volume concentration indicates a pigment volume concentration at which the one or more fillers are still wetted with the binding material.

In the case of pigment volume concentrations above the critical pigment volume concentration, cavities are in particular formed between individual filler particles. In particular, the filler particles touch each other, wherein the intermediate spaces and/or cavities are only partially filled by the binding material.

To calculate the critical pigment volume concentration, it can be advantageous if an oil absorption value for the respective filler is determined, in particular according to DIN EN ISO 787-5.

The oil absorption value is in particular an amount of varnish linseed oil (linseed oil) in g which is absorbed by 100 g of filler up to a lubricating point. The lubricating point is, in particular, a point at which a filler/linseed oil compound kneaded onto a glass plate with a spatula is not yet lubricated.

The oil absorption value and the critical pigment volume concentration are, in particular, independent of a binding material composition.

The critical pigment volume concentration (KPVC) can be calculated, for example, using the following formula:

$$KPVK = \frac{100}{1 + \dfrac{\text{oil absorption value} \cdot \rho_{FS}}{100 \cdot \rho_{linseed\,oil}}}$$

$\rho_{FS}$ refers to a density of the respective filler. $\rho_{linseed\,oil}$ refers to the density of linseed oil ($\rho_{linseed\,oil}$=0.935 g/cm³).

In particular in embodiments in which the pigment volume concentration in the coating is greater than the critical pigment volume concentration, the coating is porous, in particular open-pored.

A porosity of the coating is preferably approximately 0.01 or more and/or approximately 0.35 or less.

For example, the coating contains approximately 5% by volume or more and/or approximately 70% by volume or less of filler(s), based on a total volume of the coating.

In embodiments in which the pigment volume concentration in the coating is less than the critical pigment volume concentration or corresponds to the critical pigment volume concentration, a proportion of the binding material on the coating is preferably approximately 30% by volume or more and/or approximately 95% by volume or less, based on the total volume of the coating.

In embodiments in which the pigment volume concentration in the coating is greater than the critical pigment volume concentration, the proportion of the binding material on the coating is preferably approximately 29% by volume or more and/or approximately 94% by volume or less, based on the total volume of the coating.

In particular, a proportion of pores and/or cavities in the coating is approximately 1% by volume or more and/or approximately 35% by volume or less, based on the total volume of the coating.

Due to an open porosity of the coating, the bipolar plate preferably has a structured surface on a side provided with the coating. In an assembled state of the bipolar plate in a fuel cell stack, this can improve the removal of produced product water from the fuel cell stack.

Closed coatings can in particular protect the main body from corrosion.

The pigment volume concentration in the coating is preferably approximately 20% or more, in particular approximately 22% or more, for example approximately 24% or more.

It may be advantageous if the pigment volume concentration in the coating is approximately 65% or less, in particular approximately 60% or less, for example approximately 55% or less.

Preferably, the one or more electrically conductive fillers are selected from one or more carbon-based fillers and/or one or more fillers that comprise or are formed from an electrically conductive ceramic material.

Preferred carbon-based fillers are carbon black, graphite, graphene and carbon nanotubes.

Carbon black can be, for example, acetylene black, flame black and/or furnace black.

Chemically inert electrically conductive ceramic materials are particularly preferred as electrically conductive ceramic materials. For example, a carbide material, a nitride material, a boride material or mixtures thereof are particularly suitable for use as fillers.

Suitable carbide materials are, for example, transition metal carbides.

Suitable nitride materials are, for example, transition metal nitrides.

Suitable boride materials are, for example, transition metal borides.

The following are particularly preferred electrically conductive ceramic materials: chromium carbide, chromium nitride, tungsten carbide, tungsten nitride, titanium carbide, titanium nitride, titanium boride, zirconium carbide, zirconium nitride, molybdenum carbide, molybdenum nitride.

It may be advantageous if a ceramic powder of one or more of the materials mentioned is used as a filler/fillers.

It may be favorable if an average size and/or an average diameter of the filler particles is approximately 50 nm or more, in particular approximately 100 nm or more, for example approximately 1 μm or more.

Preferably, the average size and/or an average diameter of the filler particles is approximately 10 μm or less, in particular approximately 8 μm or less, for example approximately 7 μm or less.

It may be advantageous if the one or more fillers have a surface modification. In particular, the surface modification is a functionalization of the one or more fillers by hydroxy groups, carboxylic acid groups, amino groups, aldehyde groups, carbonyl groups, silane radicals or mixtures thereof.

It may be favorable if the coating comprises a plurality of fillers of different sizes. For example, the coating comprises at least one larger filler, which filler particles whose average size and/or average diameter is greater by a factor of five or more, in particular by a factor of six or more than an average size and/or an average diameter of filler particles of at least one further smaller filler of the coating.

For example, the fillers are selected such that larger fillers form a close packing and smaller fillers are arranged in cavities formed between adjacent filler particles.

For example, smaller, at least approximately platelet-shaped and/or at least approximately rod-shaped fillers can be arranged in cavities formed between larger fillers.

The binding material in particular forms a matrix material in which the one or more fillers are distributed. For example, the binding material wets the individual filler particles in part or completely, in particular depending on a pigment volume concentration in the coating.

It can be favorable if a silane-modified polyurethane binding material is used as the binding material.

Preferably, the binding material is formed by chemically reacting at least two components. A first component of the at least two components preferably comprises or is formed from a bifunctional or polyfunctional isocyanate compound. A second component of the at least two components preferably comprises one or more compounds that have at least two hydroxy groups or amino groups, or is formed therefrom.

The binding material is preferably based on a polyurethane or a polyurea that is formed in particular by an addition reaction of the hydroxy groups or amino groups of the second component to the isocyanate groups of the first component.

When using one or more compounds that have at least two hydroxy groups or amino groups, polyurethane/polyurea mixed polymers are in particular formed as the second component.

The binding material preferably has predominantly or completely thermosetting properties. In particular, they allow optimized corrosion resistance of the bipolar plate. In particular, the binding material, which has predominantly thermosetting properties, has optimized resistance to organic solvents and/or to acidic or alkaline aqueous solutions.

In particular, the binding material having predominantly thermosetting properties is temperature-resistant, for example during continuous operation of a fuel cell up to approximately 100° C., and/or chemically and/or physically resistant (unchanged) with respect to a fuel cell environment. In the fuel cell environment, for example, fluoride ions and/or sulfonic acids of an ionomer of a catalyst-coated membrane (CCM) are present.

In particular, the coating has sufficient flexibility to allow embossing of the coated substrate in order to generate a flow field.

For example, a bending test according to DIN EN 13523-7 results in a value of at most 0.5 T. In particular, this can confirm a resistance of the coating.

The bipolar plate according to the invention can in particular be produced more cost-effectively than a bipolar plate having an inorganic coating because in particular no vacuum processes are necessary and higher belt speeds can be achieved. In particular, the starting materials are more cost-effective.

It may be favorable if the first component is a bifunctional or polyfunctional isocyanate monomer, an oligomer of polyfunctional isocyanate monomers or a prepolymer of polyfunctional isocyanate monomers and bifunctional or polyfunctional alcohols or amines.

In the context of this description and the appended claims, the term "polyfunctional" is used for at least trifunctional compounds, in particular in contrast to bifunctional compounds.

In the case of oligomers or prepolymers formed from polyfunctional monomers, free isocyanate groups, for example, are available for a chemical reaction with the second component to form the binding material.

It may be advantageous if the isocyanate monomer is selected from diphenylmethane-2,2'-diisocyanate, diphenylmethane-2,4'-diisocyanate, diphenylmethane-4,4'-diisocyanate, toluene-2,6-diisocyanate, toluene-2,4-diisocyanate, tetramethylxylylene diisocyanate, 1,4-diisocyanatobenzene, 1,4-bis(isocyanatomethyl)benzene, 1,3-bis(isocyanatomethyl)benzene, tetramethylene diisocyanate, pentamethylene diisocyanate, hexamethylene diisocyanate, 2,4,4-trimethyl-hexamethylene-1,6-diisocyanate, 2,2,4-trimethylhexamethylene-1,6-diisocyanate, dodecamethylene diisocyanate, 1,4-diisocyanatocyclohexane, 1,3-bis(isocyanatomethyl)cyclohexane, 3-isocyanatomethyl-3,5,5-trimethylcyclohexyl isocyanate, 4,4'-diisocyanatodicyclohexylmethane and isomers thereof.

In particular, uretdione, allophanate, biuret or isocyanurate compounds can be used as dimers or trimers of these or other isocyanates. With such compounds, the functionality of the molecules to be polymerized and thus the degree of crosslinking of the binding material can be increased.

To produce the binding material, it is also possible to use isocyanate compounds, including the aforementioned monomers, for the chemical reaction, which isocyanate compounds are provided with a protective group. In particular, isocyanate groups can be blocked by reaction with an oxime (for example, butanone oxime or acetone oxime).

Additionally or alternatively, 3,5-dimethylpyrazole, ε-caprolactam and diisopropylamine can be used as blocking agents. By blocking functional groups, a premixture of the first and second components can be produced and stored. During production of the coating, the protective group is in particular thermally cleaved so that the components can react to form the binding material.

The second component is preferably selected from monomers, oligomers and prepolymers that have at least two free hydroxy groups or amino groups.

Suitable monomers include in particular alkanediols and/or alkanediamines, which may optionally additionally be substituted. The use of comb polymers having a plurality of reactive hydroxy groups or amino groups makes it possible to influence the degree of crosslinking and thus the thermosetting behavior of polymers formed.

For example, the second component is selected from hydroxy-functional or amino-functional polyacrylates, polycarbonates, polyethers, polyesters, polylactones, polyolefins, polyamides, polyureas, alkyd resins and polyalkylsiloxanes.

Particular preference is given to hydroxy-functional polyacrylates and polycarbonates, which are also referred to in particular as polyacrylate polyols or polycarbonate polyols.

It can be favorable if the one or more compounds of the second component have a molar mass of approximately 1,000 g/mol or more and/or approximately 4,000 g/mol or less.

According to an advantageous embodiment of the invention, the second component comprises one or more fluorinated compounds. These can be fluorinated monomers, oligomers or prepolymers having free hydroxy or amino groups. With the aid of fluorinated compounds, it is possible in particular to increase and/or specifically set the degree of hydrophobicity of the coating of the bipolar plate. The hydrophobic and hydrophilic properties of the coating can be important for interactions with gaseous fuels and with the adjacent gas diffusion layer.

It can be advantageous if the second component comprises one or more fluorinated compounds that have a degree of fluorination of approximately 5% or more and/or approximately 40% or less.

The degree of fluorination makes it possible to adapt the hydrophobicity of the resulting binding material, wherein in particular compounds having a high degree of fluorination have particularly high thermal resistance. Another possibility for adapting the hydrophobicity and other properties of the coating consists in using compounds different from one another as the second component, comprising both fluorinated and non-fluorinated compounds.

For example, a fluorinated hydroxy-functional polyacrylate can be used as the second component.

Preferably, the binding material is additionally formed from a carbodiimide as a further component. Carbodiimide can react, for example, with alcohols to form polyisoureas.

In particular, the binding material is additionally formed from a further component that preferably serves as an adhesion promoter to the main body, wherein in particular the further component comprises or is formed from one or more aminosiloxanes.

Particular preference is given to, for example, 3-aminopropyltriethylsiloxane as a further component. This and similar aminosiloxanes, which can be used as monomers or as oligomers, react with the isocyanate groups of the first component and/or make a quasi-covalent bond to the main body possible. In particular, a quasi-covalent bond can become formed and/or be formed with the one or more electrically conductive fillers. Particularly good adhesion and stability of the coating can thus be achieved.

The main body of the bipolar plate preferably comprises a metallic material, for example stainless steel, nickel, aluminum, titanium or alloys thereof, or is formed therefrom.

The coating preferably has a thickness of approximately 1 μm or more, in particular of approximately 3 μm or more.

The thickness of the coating is preferably approximately 20 μm or less, in particular approximately 15 μm or less.

The thickness of the coating is preferably defined in a direction running perpendicular to a main extension plane of the bipolar plate.

An adhesive strength (adhesion) between the coating and the main body is preferably GT 1 or less (better), determined in particular according to a cross-cut test according to DIN EN ISO 2409.

In the cross-cut test, the coating is cut in a lattice-like manner and an extent of flaking is optically analyzed and evaluated with a characteristic value in a range of GT 0 and GT 5. In this case, a characteristic value of GT 0 means that no flaking can be detected.

The invention further relates to a fuel cell, in particular a low-temperature fuel cell, that comprises one or more bipolar plates according to the invention.

The fuel cell is preferably a polymer electrolyte fuel cell.

One or more of the features mentioned in connection with the bipolar plate according to the invention and/or one or more of the advantages mentioned in connection with the bipolar plate according to the invention preferably apply equally to the fuel cell according to the invention.

The invention further relates to a method for producing a bipolar plate, in particular for producing a bipolar plate according to the invention.

In this respect, the object of the invention is to provide a method by means of which a bipolar plate having optimized electrical conductivity can be produced as simply as possible.

According to the invention, this object is solved by a method according to the independent method claim.

According to the method, an electrically conductive sheet material and/or an electrically conductive plate material is provided.

A coating material is applied to the electrically conductive sheet material and/or to the electrically conductive plate material.

The coating material is dried and/or cured so that an electrically conductive coating is formed.

For example, the coating material is dried and/or cured at a temperature of approximately 80° C. or more and/or approximately 180° C. or less.

The coating material comprises a binding material or one or more precursors thereof and one or more electrically conductive fillers.

The pigment volume concentration in the coating preferably corresponds at least to a pigment volume concentration required to reach a percolation threshold.

In particular, the pigment volume concentration in the coating exceeds the pigment volume concentration required to reach a percolation threshold.

The electrically conductive sheet material and/or the electrically conductive plate material in particular forms the main body of the bipolar plate in the resulting bipolar plate.

A complex pretreatment of the electrically conductive sheet material and/or of the electrically conductive plate material is in particular dispensable.

For example, a conversion layer and/or pickling the electrically conductive sheet material and/or of the electrically conductive plate material before the application of the coating material is dispensable.

One or more of the features mentioned in connection with the bipolar plate according to the invention and/or one or more of the advantages mentioned in connection with the bipolar plate according to the invention preferably apply equally to the method according to the invention.

It can be advantageous if the coating material is applied to the electrically conductive sheet material and/or the electrically conductive plate material and if a forming method is subsequently carried out, thereby forming a bipolar plate.

The coating can be applied, in particular, before forming.

Alternatively, it can be provided that the main body of the respective bipolar plate is first produced, for example by forming, and then the coating material is applied.

Preferably, the coating material is applied in a coil coating process to the sheet material and/or plate material. The coil coating method is in particular what is known as "precoating" before a forming method of the sheet material and/or plate material.

For example, the coating material is applied by doctor blade coating, rolling, spraying and/or screen printing.

In particular, the entire coating material that forms the coating of the bipolar plate is applied in exactly one layer and/or in exactly one coating step.

It may be advantageous if a critical pigment volume concentration of the one or more electrically conductive fillers is calculated by determining an oil absorption value, in particular according to DIN EN ISO 787-5.

Further preferred features and/or advantages of the invention form the subject matter of the following description and the drawings illustrating exemplary embodiments.

Identical or functionally equivalent elements are labeled with the same reference signs in all figures.

DETAILED DESCRIPTION OF THE DRAWINGS

Figure 1:
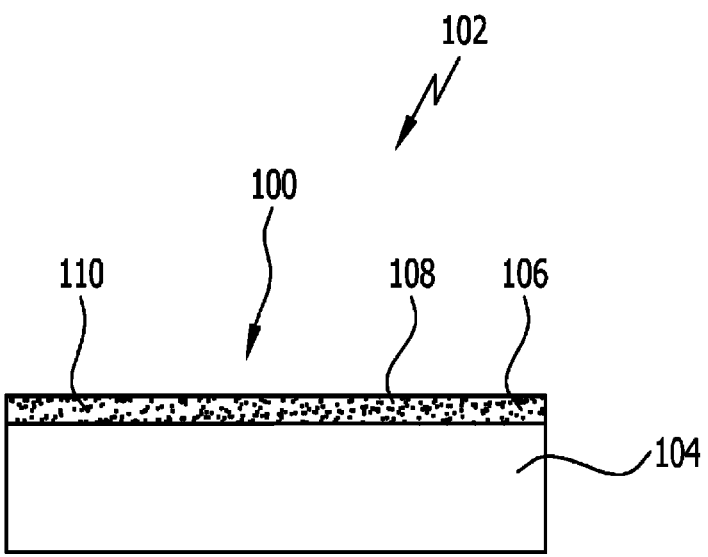
FIG. 1 a schematic sectional view of an embodiment of a bipolar plate of a fuel cell having a main body and a coating applied thereto and/or thereon.

FIG. 1 shows a bipolar plate referred to as a whole as 100.

The bipolar plate 100 preferably forms a part of a fuel cell 102 not shown as a whole in the drawings.

The fuel cell 102 is in particular a low-temperature fuel cell, for example a polymer electrolyte fuel cell.

The fuel cell 102 is particularly suitable for use in a vehicle.

In the present case, the bipolar plate 100 comprises an electrically conductive main body 104 and an electrically conductive coating 106 connected thereto.

In the present case, the electrically conductive main body 104 comprises or is formed from a metallic material. For example, the electrically conductive main body 104 comprises or is formed from stainless steel, nickel, aluminum, titanium or alloys thereof.

In the present case, the coating 106 comprises a binding material 108 and one or more electrically conductive fillers 110 (indicated schematically in FIG. 1).

Preferred electrically conductive fillers 110 are one or more carbon-based fillers and/or one or more fillers that comprise or are formed from an electrically conductive ceramic material.

Preferred carbon-based fillers are carbon black, graphite, graphene and carbon nanotubes.

Suitable carbon black includes, for example, acetylene black, flame black and/or furnace black.

Preferred electrically conductive ceramic materials include a carbide material, a nitride material, a boride material or mixtures thereof.

Suitable carbide materials are, for example, transition metal carbides.

Suitable nitride materials are, for example, transition metal nitrides.

Suitable boride materials are, for example, transition metal borides.

The following are particularly preferred electrically conductive ceramic materials: chromium carbide, chromium nitride, tungsten carbide, tungsten nitride, titanium carbide, titanium nitride, titanium boride, zirconium carbide, zirconium nitride, molybdenum carbide, molybdenum nitride.

An average size and/or an average diameter of the filler particles is preferably approximately 50 nm or more, in particular approximately 100 nm or more, for example approximately 1 μm or more.

Preferably, the average size and/or an average diameter of the filler particles is approximately 10 μm or less, in particular approximately 8 μm or less, for example approximately 7 μm or less.

It may be advantageous if the one or more fillers 110 have a surface modification. In particular, the surface modification is a functionalization of the one or more fillers 110 by hydroxy groups, carboxylic acid groups, amino groups, aldehyde groups, carbonyl groups, silane radicals or mixtures thereof.

Preferably, a plurality of fillers 110 are used that have different average sizes and/or average diameters.

For example, the fillers 110 are selected such that smaller filler particles are arranged in cavities formed by larger filler particles.

In particular, smaller, at least approximately platelet-shaped and/or at least approximately rod-shaped filler particles are arranged in cavities formed by at least approximately spherical larger filler particles.

In the present case, the pigment volume concentration in the coating 106 corresponds at least to a pigment volume concentration required to reach a percolation threshold.

In particular, the pigment volume concentration in the coating 106 corresponds to or exceeds the pigment volume concentration required to reach the percolation threshold.

It may be advantageous if the pigment volume concentration in the coating 106 corresponds to 1.5 times or less, in particular 1.2 times or less, a critical pigment volume concentration.

It can be favorable if the pigment volume concentration in the coating 106 corresponds at least approximately or exactly to the critical pigment volume concentration.

In particular to form a porous, for example open-pored, coating 106, it can be advantageous if the pigment volume concentration in the coating 106 is greater than the critical pigment volume concentration.

The critical pigment volume concentration is calculated in particular on the basis of the oil absorption value of the respective filler(s) 110.

The oil absorption value is determined in the present case according to DIN EN ISO 787-5.

The critical pigment volume concentration (KPVC) is preferably derived from the following formula:

$$KPVK = \frac{100}{1 + \dfrac{\text{oil absorption value} \cdot \rho_{FS}}{100 \cdot \rho_{linseed\,oil}}}$$

$\rho_{FS}$ refers to a density of the respective filler. $\rho_{linseed\,oil}$ refers to the density of linseed oil ($\rho_{linseed\,oil}$=0.935 g/cm$^3$).

In particular in embodiments in which the pigment volume concentration in the coating 106 is greater than the critical pigment volume concentration, the coating 106 is porous, in particular open-pored.

A porosity of the coating 106 is preferably approximately 0.01 or more and/or approximately 0.35 or less.

It may be favorable if the coating 106 contains approximately 5% by volume or more and/or approximately 70% by volume or less of filler(s), based on a total volume of the coating.

In embodiments in which the pigment volume concentration in the coating 106 is less than the critical pigment volume concentration or corresponds to the critical pigment volume concentration, a proportion of the binding material 108 is preferably approximately 30% by volume or more and/or approximately 95% by volume or less, based on the total volume of the coating 106.

In embodiments in which the pigment volume concentration in the coating 106 is greater than the critical pigment volume concentration, the proportion of the binding material 108 is preferably approximately 29% by volume or more and/or approximately 94% by volume or less, based on the total volume of the coating 106.

In particular, a proportion of pores and/or cavities in the coating 106 is approximately 1% by volume or more and/or approximately 35% by volume or less, based on the total volume of the coating 106.

In the present case, the binding material 108 is a silane-modified polyurethane binding material.

Preferably, the binding material 108 is formed by chemically reacting at least two components. A first component of the at least two components preferably comprises or is formed from a bifunctional or polyfunctional isocyanate compound. A second component of the at least two components preferably comprises one or more compounds that have at least two hydroxy groups or amino groups, or is formed therefrom.

It may be favorable if the first component is a bifunctional or polyfunctional isocyanate monomer, an oligomer of polyfunctional isocyanate monomers or a prepolymer of polyfunctional isocyanate monomers and bifunctional or polyfunctional alcohols or amines.

It may be advantageous if the isocyanate monomer is selected from diphenylmethane-2,2'-diisocyanate, diphenylmethane-2,4'-diisocyanate, diphenylmethane-4,4'-diisocyanate, toluene-2,6-diisocyanate, toluene-2,4-diisocyanate, tetramethylxylylene diisocyanate, 1,4-diisocyanatobenzene, 1,4-bis(isocyanatomethyl)benzene, 1,3-bis(isocyanatomethyl)benzene, tetramethylene diisocyanate, pentamethylene diisocyanate, hexamethylene diisocyanate, 2,4,4-trimethylhexamethylene-1,6-diisocyanate, 2,2,4-trimethylhexamethylene-1,6-diisocyanate, dodecamethylene diisocyanate, 1,4-diisocyanatocyclohexane, 1,3-bis(isocyanatomethyl)cyclohexane, 3-isocyanatomethyl-3,5,5-trimethylcyclohexyl isocyanate, 4,4'-diisocyanatodicyclohexylmethane and isomers thereof.

The second component is preferably selected from monomers, oligomers and prepolymers that have at least two free hydroxy groups or amino groups.

For example, the second component is selected from hydroxy-functional or amino-functional polyacrylates, polycarbonates, polyethers, polyesters, polylactones, polyolefins, polyamides, polyureas, alkyd resins and polyalkylsiloxanes.

It can be favorable if the one or more compounds of the second component have a molar mass of at least approximately 1,000 and/or of at most approximately 4,000 g/mol.

It can be advantageous if the second component comprises one or more fluorinated compounds that have a degree of fluorination of approximately 5% or more and/or approximately 40% or less.

Preferably, the binding material 108 is additionally formed from a carbodiimide as a further component.

In particular, the binding material 108 is additionally formed from a further component, on the basis of which adhesion between the coating 106 and the main body 104 is optimized. In the present case, the further component acts as an adhesion promoter. For example, the further component comprises one or more aminosiloxanes or is formed therefrom.

To produce the bipolar plate 100, an electrically conductive sheet material and/or an electrically conductive plate material 114 is preferably provided. The electrically conductive sheet material and/or the electrically conductive plate material 114 is preferably produced from a material mentioned in connection with the main body 104.

In the following, for three different fillers 110, for example, it is described how a pigment volume concentration for the coating 106 is calculated based on the oil absorption value determined according to DIN EN ISO 787-5.

The calculated critical pigment volume concentrations can in each case be set as the pigment volume concentration in a coating 106.

EXAMPLE 1

According to DIN EN ISO 787-5, 5.00 g of a tungsten carbide powder are mixed with 0.40 g of linseed oil, resulting in an oil absorption value of 8 g/100 g. According to the aforementioned formula, this results in a critical pigment volume concentration of 43%.

EXAMPLE 2

According to DIN EN ISO 787-5, 8.88 g of a titanium diboride powder are mixed with 1.54 g of linseed oil, resulting in an oil absorption value of 17 g/100 g. According to the aforementioned formula, this results in a critical pigment volume concentration of 54%.

EXAMPLE 3

According to DIN EN ISO 787-5, 8.50 g of a mixture of titanium diboride and acetylene black are mixed as fillers in a volume ratio of 8:0.5 with 2.08 g of linseed oil, resulting in an oil absorption value of 24.5 g/100 g. According to the aforementioned formula, this results in a critical pigment volume concentration of 24.5%.

Figure 2:
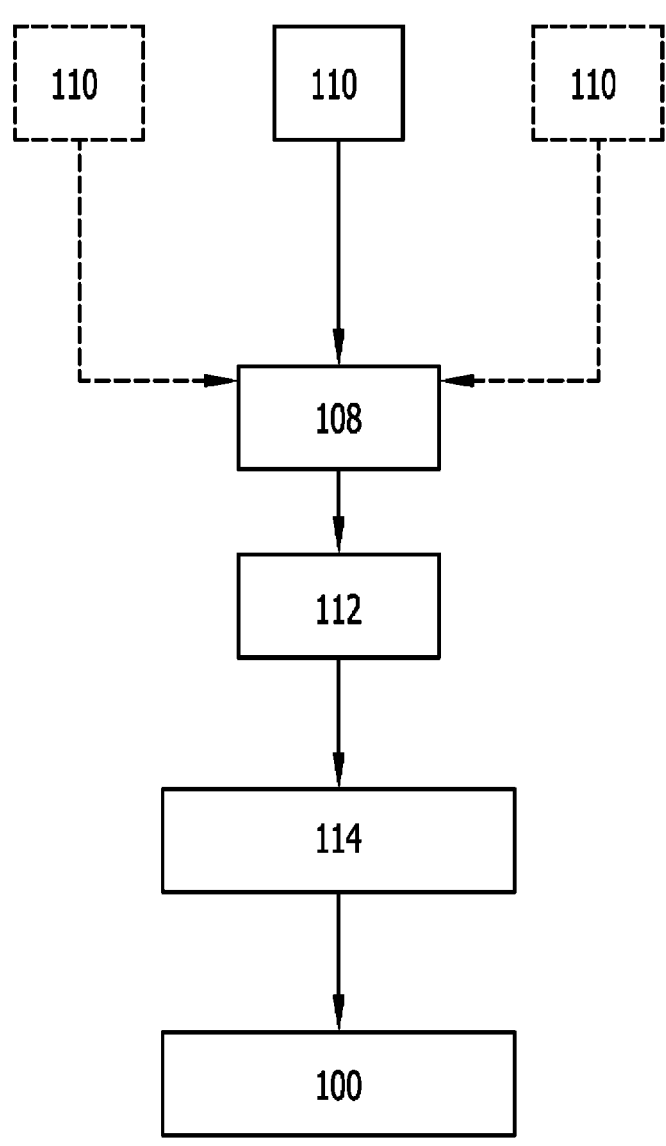
FIG. 2 a schematic view of an embodiment of a method for producing a bipolar plate.

As shown schematically in FIG. 2 in a flow diagram, a filler 110 (or a plurality of fillers 110; indicated by dashed lines) is preferably added to the binding material 108 or a precursor of the binding material 108. This results in a coating material 112.

The coating material 112 is subsequently applied to an electrically conductive sheet material and/or an electrically conductive plate material 114.

For example, the coating material 112 is applied by doctor blade coating, rolling, spraying and/or screen printing.

In particular, the coating material 112 can be applied in a coil coating process.

The coating 106 forms by means of curing and/or drying, for example at a temperature of approximately 80° C. or more and/or approximately 180° C. or less.

According to a preferred embodiment, the main body 104 of the bipolar plate 100 is produced only after the formation of the coating 106, in particular by forming.

Alternatively, it can be provided that the coating material 112 is applied to main bodies 104 already formed.

A particularly preferred embodiment is described below:

178.5 g of a hydroxy-functional binding material 108 are initially introduced into a container, for example a double-walled stainless steel vessel. 656.7 g of titanium diboride, the oil absorption value of which was determined to be 17 g/100 g, and 200 g of butyl acetate, are then added while stirring. A resulting mixture is dispersed up to an average particle size of less than 5 μm (resulting in a dispersion).

The dispersion is mixed with 37 g of a hexamethylene diisocyanate trimer, for example using a Speedmixer, and applied with a doctor blade onto a sheet material 114 in the form of a stainless steel sheet (for example, made of stainless steel 1.4404). The resulting system is subsequently dried. For the exemplary embodiment described above, a drying time of approximately 15 minutes in a circulating air furnace at approximately 150° has proven to be sufficient.

A spiral doctor blade, with which a wet film thickness of approximately 10 μm can be applied, has proven to be preferred as a doctor blade.

A thickness in a direction of the resulting coating 106 that is perpendicular to the main extension plane of the coating 106 is approximately 12 μm in the exemplary embodiment described above.

The adhesive strength (adhesion) after a cross-cut according to DIN EN ISO 2409 yielded the rating GT 0.

The flexibility of the coating 106 was evaluated by means of a bending test according to DIN EN 13523-7. For this purpose, the coated sheet material and/or plate material 114 is repeatedly bent by 180° so that the coating 106 is subjected to stretching. In this test too, the best characteristic value of T 0 resulted for the exemplary coating 106.

A surface resistance of the resulting bipolar plate 100 is in the present case approximately 9.2 mΩ cm² at approximately 100 N/cm².

For example, the bipolar plate 100 can be provided with an embossed structure.

The coating 106 can preferably be formed in a dried state on a substrate in the form of a sheet material and/or plate material 114.

In particular, the coating 106 has a high pigment volume concentration without embrittlement of the coating 106 occurring and/or a bonding strength between the coating 106 and the main body 104 of the bipolar plate 100 being reduced compared to coatings having a lower pigment volume concentration.

The coating material 112 can be applied in particular in a surface coating process.

The invention claimed is:

1. A bipolar plate comprising:
an electrically conductive main body; and
an electrically conductive coating, wherein
the electrically conductive coating comprises a binding material and one or more electrically conductive fillers,
a pigment volume concentration in the coating corresponds at least to a pigment volume concentration required to reach a percolation threshold,
the one or more electrically conductive fillers have a surface modification,
the binding material comprises an adhesion promoter component that serves as an adhesion promoter to the main body and which is coupled or couplable to the surface modification, and
a degree of the surface modification and a content of the adhesion promoter component result in an adhesive strength between the coating and the main body of GT 1 or less.

2. The bipolar plate according to claim 1, wherein the pigment volume concentration in the coating corresponds to 1.5 times or less a critical pigment volume concentration.

3. The bipolar plate according to claim 1, wherein the coating is porous and/or open-pored.

4. The bipolar plate according to claim 1, wherein the one or more electrically conductive fillers are selected from
one or more carbon-based fillers, carbon black, acetylene black, flame black, furnace black, graphite, graphene, carbon nanotubes; and/or
one or more fillers that comprise or are formed from an electrically conductive ceramic material, a carbide material, a transition metal carbide, a nitride material, a transition metal nitride, a boride material, a transition metal boride, or mixtures thereof.

5. The bipolar plate according to claim 1, wherein the surface modification is a functionalization by hydroxy groups, carboxylic acid groups, amino groups, aldehyde groups, carbonyl groups, silane radicals or mixtures thereof.

6. The bipolar plate according to claim 1, wherein the binding material is formed by means of a chemical reaction of at least two components, wherein a first component of the at least two components comprises or is formed from a bifunctional or polyfunctional isocyanate compound, and wherein a second component of the at least two components comprises or is formed from one or more compounds that have at least two free hydroxy groups or amino groups.

7. The bipolar plate according to claim 6, wherein the first component is a bifunctional or polyfunctional isocyanate monomer, an oligomer of polyfunctional isocyanate monomers, or a prepolymer of polyfunctional isocyanate monomers and bifunctional or polyfunctional alcohols or amines.

8. The bipolar plate according to claim 6, wherein the second component is selected from monomers, oligomers and prepolymers that have at least two free hydroxy groups or amino groups.

9. The bipolar plate according to claim 6, wherein the second component comprises one or more fluorinated compounds that have a degree of fluorination of 5% or more and/or 40% or less.

10. The bipolar plate according to claim 1, wherein the adhesion promoter component contains a carbodiimide.

11. The bipolar plate according to claim 1, wherein the adhesion promoter component comprises or is formed from one or more aminosiloxanes.

12. The bipolar plate according to claim 1, wherein adhesive strength between the coating and the main body is GT 0.

13. A fuel cell comprising one or more bipolar plates according to claim 1.

14. A method for producing the bipolar plate, according to claim 1, wherein the method comprising:
providing an electrically conductive sheet material and/or an electrically conductive plate material;
applying a coating material to the electrically conductive sheet material and/or the electrically conductive plate material; and
drying and/or curing the coating material such that an electrically conductive coating is formed,
wherein the coating material comprises a binding material or one or more precursors thereof and one or more electrically conductive fillers, and wherein a pigment volume concentration in the coating corresponds at least to a pigment volume concentration required to reach a percolation threshold.

15. The method according to claim 14, wherein the coating material is applied to the electrically conductive sheet material and/or the electrically conductive plate material and wherein a forming method is subsequently carried out, thereby forming a bipolar plate.

16. The bipolar plate according to claim 1, wherein the pigment volume concentration in the coating corresponds to 1.2 times or less a critical pigment volume concentration.

17. The bipolar plate according to claim 1, wherein the pigment volume concentration in the coating corresponds to the critical pigment volume concentration.

18. The bipolar plate according to claim 3, wherein the porosity is 0.01 or more.

19. The bipolar plate according to claim 3, wherein the porosity is 0.35 or less.

\* \* \* \* \*